United States Patent [19]
Hudson

[11] Patent Number: 5,901,356
[45] Date of Patent: May 4, 1999

[54] CHANNEL ALLOCATION PATTERN IN A CELLULAR COMMUNICATIONS SYSTEM

[75] Inventor: John Edward Hudson, Stansted, United Kingdom

[73] Assignee: Northern Telecom Limited, Montreal, Canada

[21] Appl. No.: 08/628,738

[22] PCT Filed: Jul. 28, 1995

[86] PCT No.: PCT/GB95/01771

§ 371 Date: May 2, 1996

§ 102(e) Date: May 2, 1996

[87] PCT Pub. No.: WO96/04761

PCT Pub. Date: Feb. 15, 1996

[30]  Foreign Application Priority Data

Aug. 4, 1994 [GB] United Kingdom .................... 9415807
Jun. 5, 1995 [GB] United Kingdom .................... 9511311

[51] Int. Cl.⁶ ................................................... H04Q 7/36
[52] U.S. Cl. .......................... 455/451; 455/447; 455/452; 455/453
[58] Field of Search ................................... 455/447, 450, 455/451, 452, 453; 370/297

[56]  References Cited

U.S. PATENT DOCUMENTS

| | | | |
|---|---|---|---|
| 4,352,110 | 9/1982 | Braak ....................................... | 343/844 |
| 5,111,534 | 5/1992 | Benner .................................... | 455/447 |
| 5,247,699 | 9/1993 | Hartman ................................. | 455/447 |
| 5,365,571 | 11/1994 | Rha ........................................ | 455/446 |

FOREIGN PATENT DOCUMENTS

| | | |
|---|---|---|
| 0 429 200 | 5/1991 | European Pat. Off. . |
| 0 435 283 | 7/1991 | European Pat. Off. . |
| WO 92/22148 | 12/1992 | WIPO . |

OTHER PUBLICATIONS

Mouly, "Regular Cellular Reuse Patterns", IEEE Vehicular Technology Conference, Jul. 1991, pp. 684–688.

Ramos, "Designs of an Urban Point–to–Multipoint Millimetric Radio System with a Two Level Hierarchy", Radio Relay Systems, Oct. 11–14, 1993, pp. 57–62.

Besharatian, "An Approach To The Design Of Reliable Cellular Radio Network For The Metropolitan Area Network (MAN)", IEEE International Conference On Communications, vol. 2, pp. 28.1.1–28.1.5, Jun. 23–26, 1985.

Primary Examiner—Edward F. Urban
Assistant Examiner—Chieu V. Luu
Attorney, Agent, or Firm—Lee, Mann, Smith, McWilliams, Sweeney & Ohlson

[57]  ABSTRACT

A method of allocating channels in a cellular system in which sectored base sites serve subscribers equipped with directional antennas. A plurality of available communication channels is divided into channel subsets. Base sites are arranged in clusters, and within each cluster: the number of channel subsets is equal to the number of base sites, is greater than the number of sectors per base site and is not a multiple of the number of sectors per base site; each channel subset is allocated once in each of the different sector directions; and the allocation pattern is not repeated within the cluster, whereby to minimize co-channel interference.

10 Claims, 3 Drawing Sheets

CHANNEL ALLOCATION PATTERN IN A CELLULAR COMMUNICATIONS SYSTEM

TECHNICAL FIELD

This invention relates to cellular communications systems.

BACKGROUND OF THE INVENTION

Cellular communications systems are well known for mobile subscribers, where fixed base stations serve handsets or vehicle-mounted units. Cellular systems are now being developed for fixed subscribers which will replace the conventional land line between a telephone subscriber and their local exchange by a wireless link. It is possible to provide fixed subscribers with a directional antenna which points towards the base station serving the area in which the subscriber is located (or some adjacent base station providing a better signal).

In cellular systems the coverage area is divided into cells, each cell served by a base station or base site which is allocated a channel or band of channels, i.e. a channel subset, selected from a limited number of available channels. In order to accommodate as many subscribers as possible it is important to make maximum use of the channels by frequently reusing them while maintaining an acceptable level of interference between neighboring cells operating on the same channels (known as co-channel interference). One of the known methods for increasing capacity is to divide each cell or base site into sectors, each sector being allocated a characteristic channel subset.

In some conventional sectored systems, channels are allocated such that the same channel is given to corresponding, similarly aligned, sectors in each base site or base site cluster. This causes a problem in that subscribers receive signals not only from the base site serving their particular sector but also from other base site sectors operating on the same channel. These systems still pose a problem when subscribers have narrow beamed directional antennas because the directional antenna is still aligned with both the wanted and unwanted (interfering) base site sectors.

There have been some attempts to reduce co-channel interference by varying the direction in which sectors or cells having the same channel face. European Patent Application EP 429 200 (GEC) illustrates some back-to-back and partially rotated sectored base site arrangements for microwave broadcast systems. U.S. patent application U.S. Pat. No. 4,352,110 provides a cluster of outward-facing unsectored directional base sites arranged in concentric rings, which requires a prohibitively large number of base sites to serve an area. Another patent application, WO 92/22148, illustrates a five base site, sixteen sectored arrangement. This specification acknowledges that subscribers could be directional, but does not fully exploit the subscribers' directional properties in allocating channels. Furthermore, patent application EP No. 435,283 (NEC) shows several arrangements of sectored sites, one of which rotates an entire cluster of base sites by 120° clockwise or anti-clockwise.

Most of the systems shown in the prior art are concerned with serving subscribers who are equipped with omnidirectional antennas, which receive signals equally from all directions. The allocation of channels to base sites in these systems is therefore restricted to prevent strong unwanted interfering signals. These allocation patterns may be applied to systems which serve directional subscribers, but they fail to exploit the improvements in channel re-use which directional subscribers allow.

It is an object of the present invention to minimise both co-channel interference and the number of base sites required in a cellular communications system which serves directional subscribers.

SUMMARY OF THE INVENTION

According to the invention there is provided a method of defining a channel allocation pattern in a cellular communications system in which sectored base sites having sectors pointing in different directions serve directional subscribers, the method including arranging the base sites in clusters wherein within each said cluster:

the number of channel subsets is equal to the number of base sites and is greater than the number of sectors per base site and is not a multiple of the number of sectors per base site;

each channel is subset allocated once in each of the different sector directions, and;

the allocation pattern is not repeated within the cluster, whereby to minimise co-channel interference.

According to another aspect of the invention there is provided a cellular communications system in which sectored base sites having sectors pointing in different directions serve directional subscribers, the base sites being arranged in clusters, wherein the pattern of channels allocated within each said cluster is such that:

the number of channel subsets is equal to the number of base sites, is greater than the number of sectors per base site and is not a multiple of the number of sectors per base site;

each channel subsets is allocated once in each of the different sector directions, and;

the allocation pattern is not repeated within the cluster, whereby to minimise co-channel interference.

One particularly advantageous embodiment of the invention uses tri-sectored base sites arranged in clusters of four base sites, four channel subsets being used within each of the clusters.

Another particularly advantageous embodiment of the invention uses tri-sectored base sites arranged in clusters of seven base sites, seven channel subsets being used within each of the clusters.

While the invention is particularly suitable for fixed subscribers who can easily be equipped with directional antennas, it would also be applicable to a mobile system where mobile subscribers are provided with directional antennas.

It is to be understood that a 'sector' is an area served by the beam of a base station antenna.

The term 'channel' is used in this specification to represent a frequency, time slot, code or any combination of these as the invention is applicable to cellular systems operating according to FDMA, TDMA, CDMA or combinations of such schemes.

The cellular communications system is preferably one which provides two-way telecommunications traffic to the subscribers.

DESCRIPTION OF PREFERRED EMBODIMENTS

Cellular systems have cells grouped in clusters; the clusters may be of a size (1,3,4,7,9,12 . . . cells) which permits neat tessellation, although irregular cluster sizes are now common.

Figure 1:
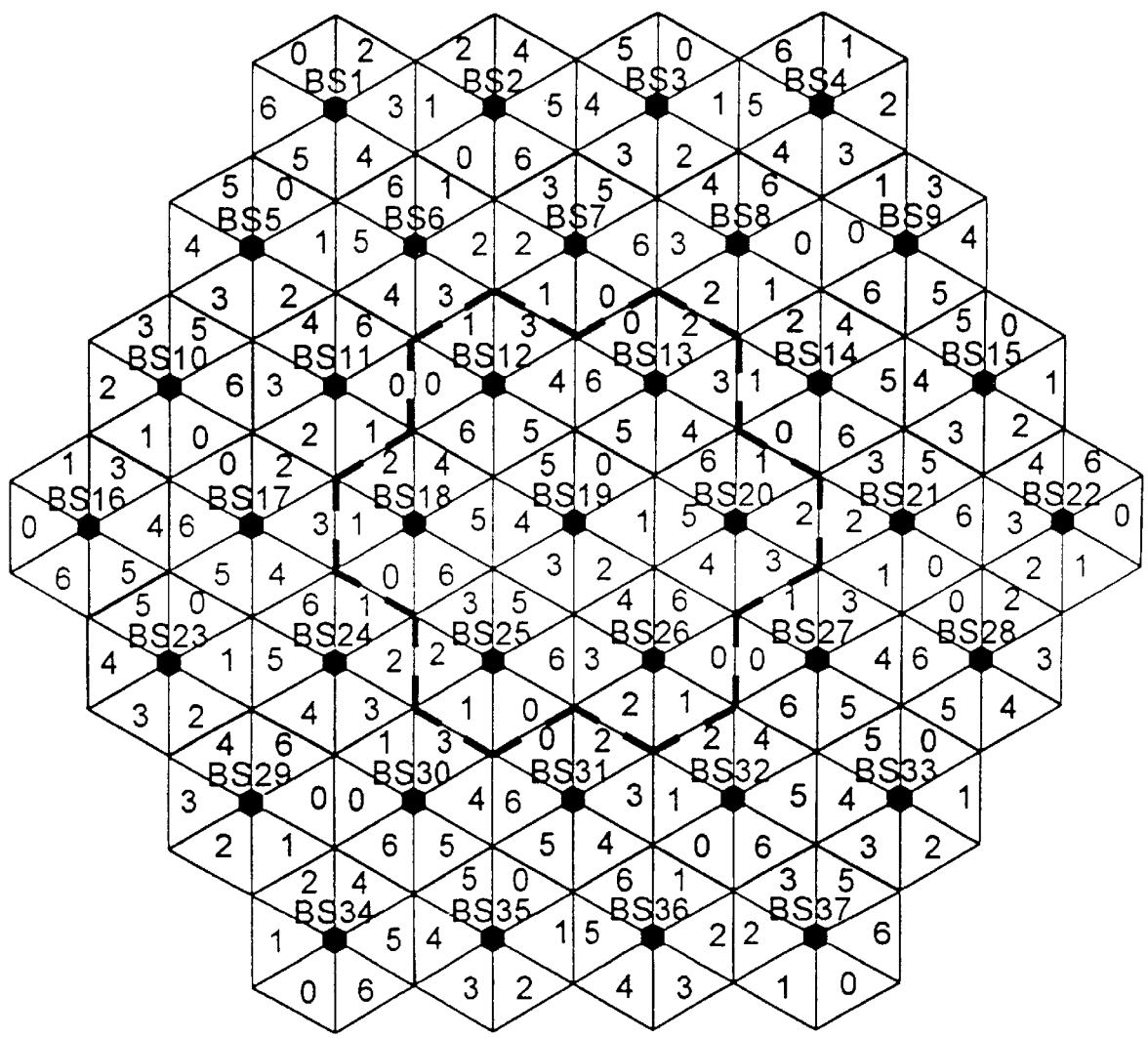
FIG. 1 is a schematic diagram of a sectored cellular system in accordance with a first embodiment of the invention.

Sectored base sites may be centrally located within a cell to serve radially extending cell sectors, as in FIG. 1 (so-called center-excitation). Alternatively, each sector antenna of the base site may serve a cell, with the base sites positioned at the edges of the cells as in FIGS. 2 and 3 (so-called edge-excitation). Edge-excitation provides better coverage than center-excitation because an antenna radiation pattern better fits the shape of a circular/hexagonal cell than that of a wedge-shaped sector portion.

Referring now to FIG. 1, there is shown an arrangement in accordance with a first embodiment of the invention. Sectored base sites BS1–BS37 center-excite cells. A cluster of seven base sites BS12, BS13, BS18, BS19, BS20, BS25, BS26 is highlighted by a dashed area, each base site having six sectors which are allocated six out of the seven available channel subsets for the cluster.

One general method for allocating channel subsets to the sectors of a cluster of center-excited base sites is as follows:

(i) every base site is assigned a code K corresponding to its position in the cluster of base sites e.g. K∈{0,1 . . . }. Base sites having the same code lie on a hexagonal pattern;

(ii) all base sites are then sectored. The sectors are numbered F=0,1,2 . . . from North going round clockwise;

(iii) the sector channel subset number C is found as C=(K+F) Modulo N where N is the total number of channel subsets or channel bands.

This algorithm ensures that each base site with a given code has the same pattern of channel subsets.

FIG. 1 shows the result of allocating channel subsets in this manner. Applying the method to the highlighted cluster of base sites:

(i) Each base site in the cluster is given a code K∈{0,1, 2,3,4,5,6}, so:
BS19 (K=0), BS20 (K=1), BS13 (K=2), BS12 (K=3).

(ii) each base site has 6 sectors numbered F=0 . . . 5

(iii) the sector channel subset number (0,1,2,3,4,5,6) for each sector is found as:
C=(K+F) modulo 7

This results in base site BS19 using channel subsets (0,1,2,3,4,5), BS20 using channel subsets (1,2,3,4,5,6) and so on. By examining all of the sectors of one base site cluster it is possible to demonstrate the performance of this layout. Each of the seven channel subsets is used once in each of the differently facing sector directions, thereby reducing the possibility of a subscriber receiving a signal on the same channel from more than one base site within the cluster. This allocation method has the effect of progressively rotating the channel subset allocation pattern anti-clockwise by one sector for each base site in the cluster, one channel subset also changing with each rotation. A clockwise rotation is also possible.

Note that base site clusters arranged in this way, with efficient re-use of channel subsets in differently facing sectors, only works with subscribers who are equipped with directional antennas. Conventional omnidirectional antennas will receive strong interfering signals on the same channel from adjacent or nearby base sites at many places in this allocation pattern. See for example base sites BS12 and BS19 where channel subset 5 is used in facing sectors. With directional subscribers such allocations can be used.

Choosing the number of channel subsets (and hence base sites) in the cluster relative to the number of sectors per base site has an effect on co-channel interference levels. A number of channel subsets which is not a multiple of the number of sectors per base site (e.g. seven channel subsets per cluster and six sectors per base site, as in FIG. 1) gives best results and leads to a complicated pattern of channel subset allocations.

The values of six sectors per base site and clusters of seven base sites/channel subsets have been used as an example. It will be evident that other values could be used, e.g. 6 sectors per base site, 9 base sites per cluster.

Figure 2:
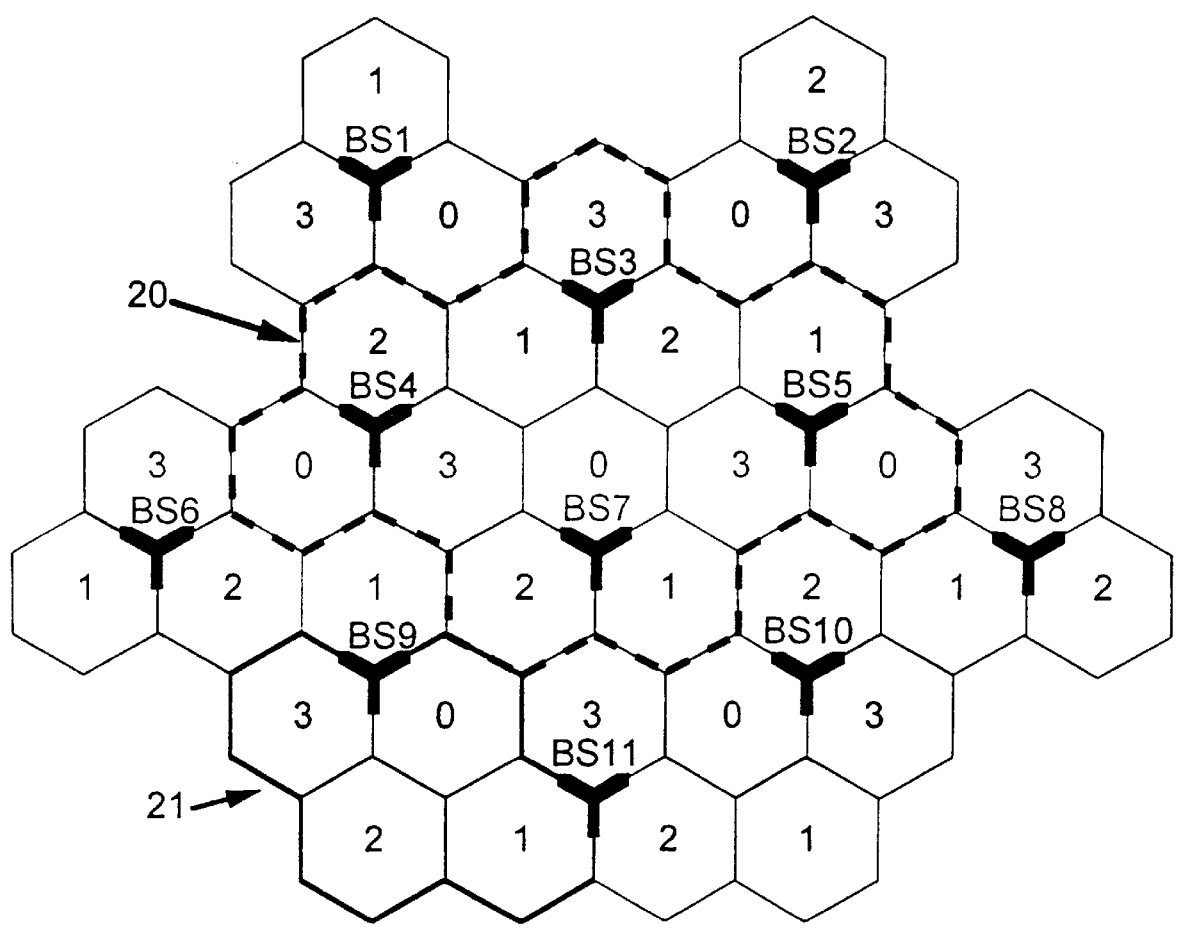
FIG. 2 is a schematic diagram of a sectored cellular system in accordance with a second embodiment of the invention.
Figure 3:
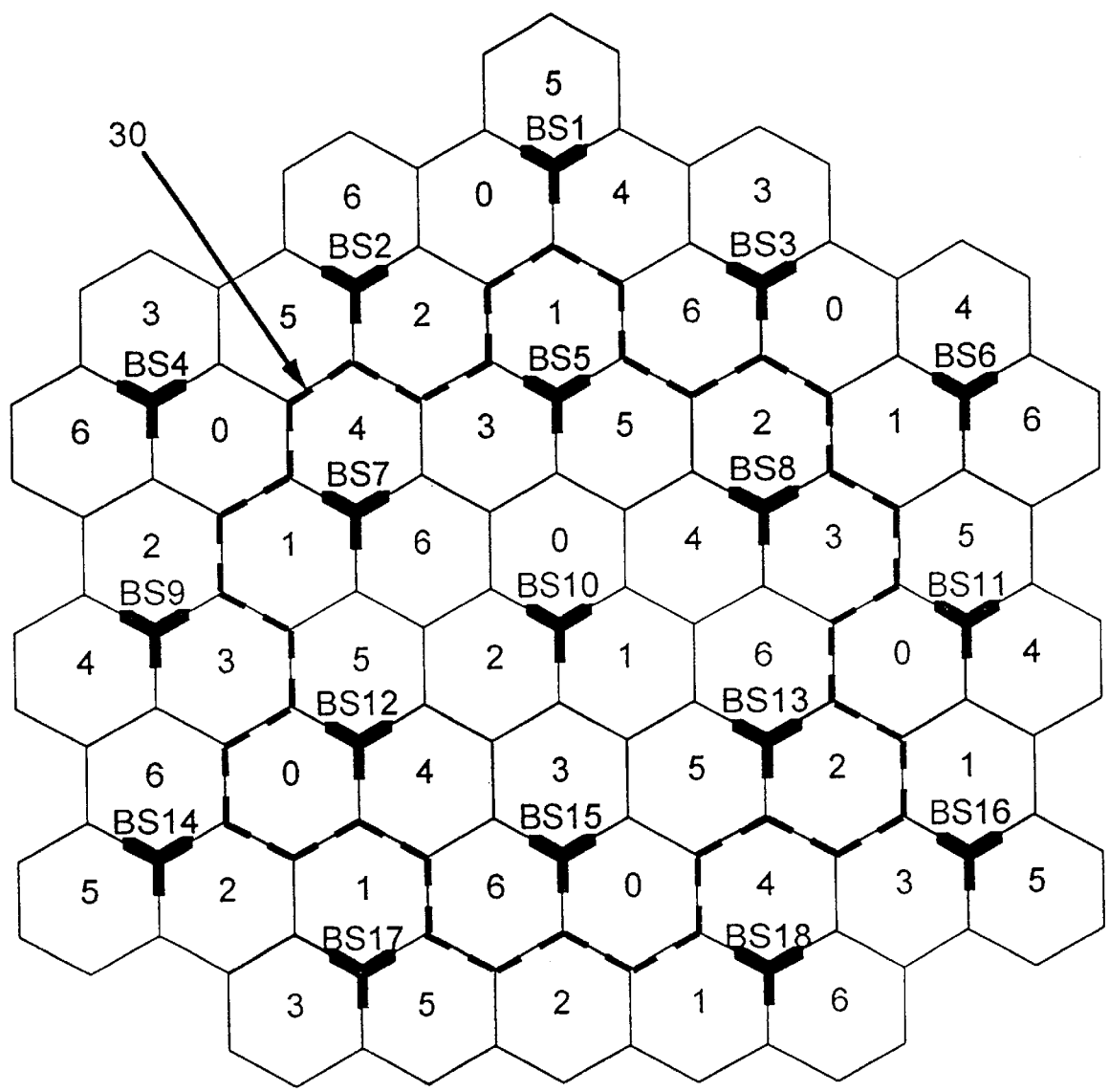
FIG. 3 is a schematic diagram of a sectored cellular system in accordance with a third embodiment of the invention.

FIGS. 2 and 3 show two edge-excited arrangements which give particularly advantageous results. These use tri-sectored base sites, edge-exciting cells with four or seven base sites in each cluster. Each of these will now be examined.

FIG. 2 shows an edge-excited pattern of tri-sectored base sites BS1–BS11 with four base sites per cluster. Base sites BS3, BS4, BS5 and BS7, shown within dashed area 20, form one such cluster of four sites. Four channel subsets are used within each cluster (shown here as 0,1,2,3), each channel subset being used once in each of the different sector directions. Within each cluster of base sites the pattern of channel subset allocations does not repeat.

A tessellating pattern of channel subsets (0,1,2,3), highlighted as 21, is repeated across an area. All of the cells using channel subset 0 lie on a hexagonal lattice, all of the cells using channel subsets 1 on a similar but displaced lattice and so on, just as in a conventional array of centreexcited cells with a re-use factor of four. Indeed, this could be an existing arrangement of center-excited cells. The base sites are then laid down on this pattern, each base-site being placed at the corner of three cells. While the pattern of cells having the same channel subsets repeats every four cells, it will be noted that adjacent cells which re-use the same channel subset are served by base sites which point in different directions. For example, considering the use of channel subset 0 within the cluster of base sites, base sites BS4, BS5 and BS7 all use channel subset 0, but each time in differently facing sectors. The pattern of cells allocated the same channel and served by a base site sector facing in a particular direction repeats once every four base sites i.e. every twelve cells.

FIG. 3 shows an edge-excited pattern of tri-sectored base sites BS1–BS18 with seven base sites per cluster. Base sites BS5, BS7, BS8, BS10, BS12, BS13 and BS15, enclosed by dashed area 30, form one cluster of seven sites. As before, within each cluster of base sites the pattern of channel subset allocations does not repeat. Seven channel subsets are used within each cluster, each channel subset being used once in each of the different sector directions. The pattern does repeat once every seven base sites (twenty-one cells). Using a larger number of channel subsets and increasing the cluster size in this manner further reduces co-channel interference. The seven channel subset system is preferable in environments where interference is a problem but it offers a lower capacity since the available spectrum is divided into seven channel subsets bands rather than four. The levels of interference experienced depend mostly on the amount of anomalous propagation due to terrain and fading due to buildings.

It will be apparent that these arrangements offer reduced levels of co-channel interference on both the down-link (base site to subscriber) and the up-link (subscriber to base site) when the subscriber is provided with a directional antenna. A subscriber may be equipped with an antenna having a beamwidth of around 20°.

A modification to still further reduce co-channel interference is to increase the distance between base sites of the cluster by leaving blank sites (using other sets of channel subsets). Spreading the base sites maintains the same directional properties.

A common technique to increase capacity in cellular systems is to cell-split i.e. a single cell is split into a cluster of smaller cells. The invention may be applied to split cells, and in such cases a cluster of rotated cells may be fitted into a cell, which itself may be part of a rotated cell cluster.

I claim:

1. A method of defining a channel allocation pattern in a cellular communications system in which sectored base sites having sectors pointing in different directions serve directional subscribers, the method including providing a plurality of available channels which is divided into channel subsets and arranging the base sites in clusters wherein within each said cluster:

the number of channel subsets is equal to the number of base sites, is greater than the number of sectors per base site and is not a multiple of the number of sectors per base site;

each channel subset is allocated once in each of the different sector directions, and;

the allocation pattern is not repeated within the cluster, whereby to minimise co-channel interference.

2. A method of defining a channel allocation pattern as claimed in claim 1 wherein the channel subsets allocated to the sectors of one base site are a rotation of those applied to an adjacent base site.

3. A method of defining a channel allocation pattern as claimed in claim 1 wherein the base sites edge-excite cells.

4. A method of defining a channel allocation pattern as claimed in claim 3 wherein a tessellating pattern of cells, each cell using a different channel subset, is repeated across an area and the sectored base sites are overlaid on this pattern at intersections of the cells.

5. A method of defining a channel allocation pattern as claimed in claim 3 wherein the base sites are tri-sectored and the clusters comprise four base sites, four channel subsets being used within each of the clusters.

6. A method of defining a channel allocation pattern as claimed in claim 3 wherein the base sites are tri-sectored and the clusters comprise seven base sites, seven channel subsets being used within each of the clusters.

7. A method of defining a channel allocation pattern as claimed in claim 4 wherein the base sites are tri-sectored and the clusters comprise four base sites, four channels being used within each of the clusters.

8. A method of defining a channel allocation pattern as claimed in claim 4 wherein the base sites are tri-sectored and the clusters comprise seven base sites, seven channels being used within each of the clusters.

9. A cellular communications system in which sectored base sites having sectors pointing in different directions serve directional subscribers, the base sites being arranged in clusters, there being a plurality of available channels which is divided into channel subsets and wherein the pattern of channels allocated within each said cluster is such that:

the number of channel subsets is equal to the number of base sites, is greater than the number of sectors per base site and is not a multiple of the number of sectors per base site;

each channel subset is allocated once in each of the different sector directions, and;

the allocation pattern is not repeated within the cluster, whereby to minimise co-channel interference.

10. A cellular communications system as claimed in claim 9 in which the directional subscribers are fixed subscribers.

* * * * *